United States Patent [19]

Prassas

[11] Patent Number: 4,917,535

[45] Date of Patent: Apr. 17, 1990

[54] PRESSURE COMPENSATING FLOW RATE CONTROL DEVICE WITH DUAL OPERATING MODES

[75] Inventor: Thomas N. Prassas, Phoenix, Ariz.

[73] Assignee: Aquapore Moisture Systems, Phoenix, Ariz.

[21] Appl. No.: 340,324

[22] Filed: Apr. 19, 1989

[51] Int. Cl.⁴ .............................................. A01G 25/06
[52] U.S. Cl. ....................................... 405/36; 405/51; 137/599; 251/117
[58] Field of Search .......................... 137/599, 599.1; 251/117; 405/36, 37, 39, 51; 239/104, 106, 569

[56] References Cited

U.S. PATENT DOCUMENTS

| | | | |
|---|---|---|---|
| 805,237 | 11/1905 | Sears | 137/550 X |
| 3,075,550 | 1/1963 | Keith | 137/599 |
| 3,348,694 | 10/1967 | Smith | 210/390 |
| 4,056,474 | 11/1977 | Snouffer | 210/390 |
| 4,351,727 | 9/1982 | Brogger | 210/411 |
| 4,517,316 | 5/1985 | Mason | 405/43 X |
| 4,615,642 | 10/1988 | Mason | 405/45 |
| 4,722,794 | 2/1988 | Duncan | 210/432 |
| 4,812,082 | 3/1989 | Cooper | 405/36 |

FOREIGN PATENT DOCUMENTS 1020083  5/1983  U.S.S.R. .................................. 405/39

Primary Examiner—Dennis L. Taylor
Assistant Examiner—John A. Ricci
Attorney, Agent, or Firm—Marvin E. Jacobs

[57] ABSTRACT

A pressure compensating flow rate control device includes a one-piece molded plastic body having an external surface with a recessed inlet port for receiving a fluid and a recessed outlet port for discharging a fluid. First and second passages are defined internally of the body and extend between the inlet and outlet ports to provide first and second internal fluid flow paths through the body from the inlet port to the outlet port. A flow regulating mechanism is disposed in a first chamber in the first passage for regulating fluid flow through the first flow path to provide a preset constant rate of fluid flow from the body at the outlet port and thereby define a controlled mode of operation of the device. A flow diverting mechanism is disposed in a second chamber in the second passage and has an actuating element exposed through the opening of the second chamber for adjusting the flow diverting mechanism between a first condition for blocking fluid flow through the second flow path and a second condition for permitting fluid flow through the second flow path and thereby for correspondingly operating the device in the controlled mode to discharge fluid from the outlet port at the constant flow rate and in a by-pass mode to discharge fluid from the outlet port at an augmented flow rate which combines fluid flow through the second flow path with fluid flow through the first flow path and is thereby higher than the constant flow rate alone.

28 Claims, 2 Drawing Sheets

PRESSURE COMPENSATING FLOW RATE CONTROL DEVICE WITH DUAL OPERATING MODES

TECHNICAL FIELD

The present invention relates generally to subsurface micro irrigation systems and, more particularly, is concerned with a pressure compensating flow rate control device with controlled and by-pass flow rate modes of operation.

BACKGROUND OF THE INVENTION

A subsurface micro irrigation system marketed and manufactured by Aquapore Moisture Systems of Phoenix, Arizona is designed for applying the precise amount of water directly to the plant root zone. The objective of the micro irrigation system is to constantly supply each plant with sufficient soil moisture to meet its evapotranspiration demands.

A typical subsurface micro irrigation system can include a main water supply line connected to a source of water and a plurality of feed lines of porous irrigation pipe extending from the main water supply line. The feed lines are buried several inches beneath the surface of the ground to deliver water directly to the plant root zones. The terminal ends of the feed lines are connected to flush ports either directly or via flush lines. Flow regulators are coupled between the main line and feed lines to ensure a constant downstream flow of water regardless of pressure variations upstream for applying the precise amount of water to the plant root zones by the feed lines. Pressure gauges are installed downstream of the flow regulators to monitor water pressure in the flow lines.

An ideal soil moisture is thus maintained by means of water delivered at controlled constant rates through the feed lines of porous irrigation pipe. In response to low water pressure, the pores in the walls of the pipe pass water from the pipe and out into the soil. By capillary action, the water then moves through the soil to the plant roots. Also, chemical nutrients and fertilizers can be injected into the feed lines and fed to the plant root zones through the pipe wall pores for optimization of the root zone environment.

The micro's irrigation system preferably employs a porous pipe that emits water throughout its surface when placed under pressure. A preferred porous pipe is described in U.S. Pat. No. 4,517,316. This type of porous pipe contains a dispersion of elastoner particles such as ground rubber reclaimed from tires in a thermoplastic binder such as polyethylene. Apparently the polyethylene does not bind well to the rubber granules forming channels from the inside of the pipe to the outer wall. The porous pipe appears to weep water when placed under pressure.

From time to time, minerals from hard water and other debris can accumulate and deposit in the pores of the porous pipe walls and begin to clog the feed lines. This condition can be detected by noting an increase in water pressure at the pressure gauges since the flow regulators in the feed lines function to emit the same amount of water, even as the pipe wall pores begin to clog, but just at a higher pressure. In order to unclog the pores of the pipe walls, the water pressure can be substantially increased to expand the pipe walls and their pores and thereby dislodge the trapped minerals and debris. Pore clearing or cleaning is enhanced by material such as detergents.

One prior art approach to increasing water pressure for the purpose of unclogging the porous pipe is to provide a branch assembly in each feed line composed of pipe elbows, tees and short sections for connecting a by-pass valve in parallel with each flow regulator and to allow injection of cleaning material. The by-pass valve is opened temporarily whenever unclogging has to be undertaken. A significant shortcoming of this prior art approach is the added time and expense of installing and maintaining the components of these branch assemblies. As a consequence, there is a need for improvement of this prior art approach to reduce or eliminate this shortcoming.

SUMMARY OF THE INVENTION

The present invention provides a pressure compensating flow rate control device designed to satisfy the aforementioned needs. The pressure compensating flow rate control device of the present invention is equipped with features permitting controlled and by-pass flow rate modes of operation.

The pressure compensating flow rate control device includes a body having an external surface with a recessed inlet port for receiving a fluid and a recessed outlet port for discharging a fluid. First and second passages are defined internally of the body and extend between the inlet and outlet ports for respectively providing first and second internal fluid flow paths through the body from the inlet port to the outlet port. First and second chambers are defined internally of the body respectively in the first and second passages and spaced from the inlet and outlet ports. The first chamber is closed at the external surface of the body, whereas the second chamber has an opening defined at the external surface of the body. A flow regulating mechanism is disposed in the first chamber and hidden from view at the external surface of the body for regulating fluid flow through the first flow path to provide a preset constant rate of fluid flow from the body at the outlet port and thereby define a controlled mode of operation of the device. A flow diverting mechanism is disposed in the second chamber and has an actuating element exposed through the opening of the second chamber for adjusting the flow diverting mechanism between a first condition for blocking fluid flow through the second flow path and a second condition for permitting fluid flow through the second flow path and thereby for correspondingly operating the device in the controlled mode to discharge fluid from the outlet port at the constant flow rate and in a by-pass mode to discharge fluid from the outlet port at an augmented flow rate which combines fluid flow through the second flow path with fluid flow through the first flow path and is thereby higher than the constant flow rate alone.

Further, the device has an auxiliary port for receiving a fluid, a pressure port for connection with a pressure gauge, and an access port for permitting installation and replacement of the flow regulating mechanism. The auxiliary port is recessed in the external surface of the body and connected to the first and second passages upstream of the respective first and second chambers therein. The pressure port is recessed in the external surface of the body and connected to the first and second passages downstream of the respective first and second chambers therein. The access port is recessed in the external surface of the body and connected to the first passage upsteam of and in axial alignment with the first chamber.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
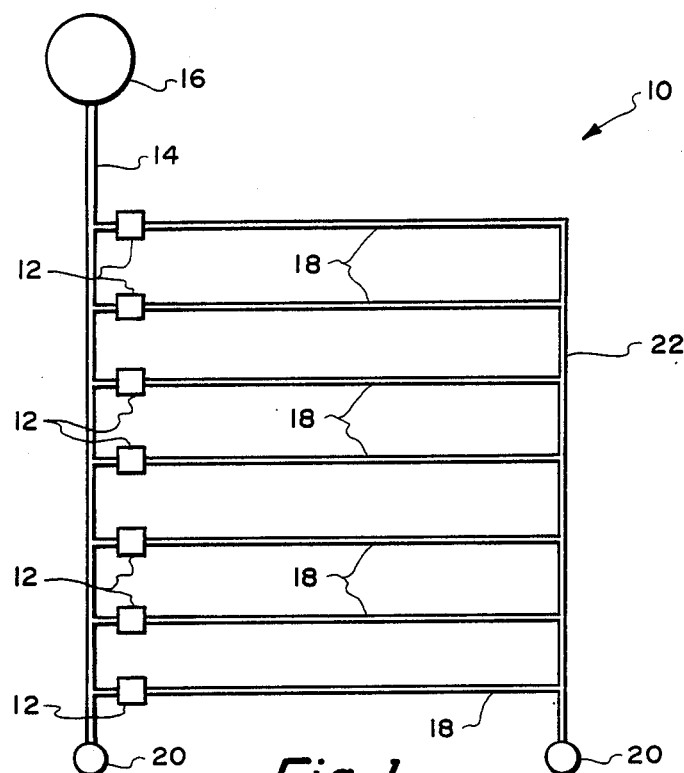
FIG. 1 is a schematic view of a subsurface micro irrigation system incorporating a fluid flow rate control device in accordance with the present invention.

Referring now to the drawings, and particularly to FIG. 1, there is illustrated an exemplary embodiment of a subsurface micro irrigation system, generally designated 10, which incorporates a plurality of fluid flow rate control devices 12 in accordance with the present invention. The irrigation system 10 include a main water supply line 14 connected to a source 16 of water and a plurality of feed lines 18 composed of porous irrigation pipe-extending from the main water supply line 14. The porous pipe of the feed lines has walls with pores which permit passage of water through the walls in response to the pressure of the water. One example of porous pipe that can be used is disclosed in U.S. Pat. No. 4,517,316 to Mason. The feed lines 18 are buried several inches beneath the surface of the ground to deliver water directly to the plant root zones. The terminal ends of the feed lines 18 are connected to flush ports 20 either directly or via flush lines 22.

Figure 2:
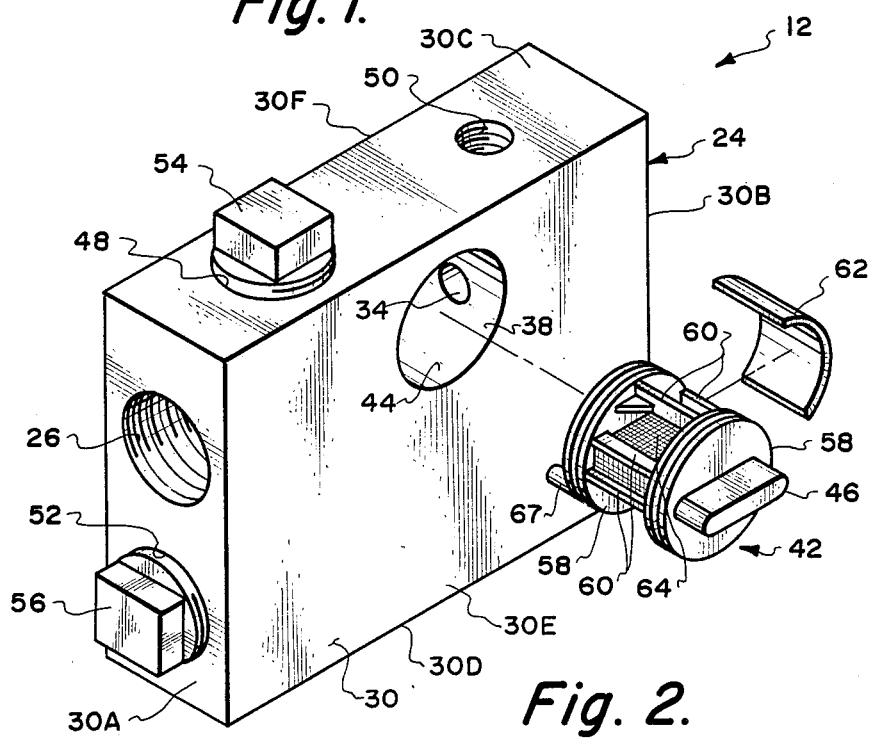
FIG. 2 is a isometric perspective view of the fluid flow rate control device.
Figure 3:
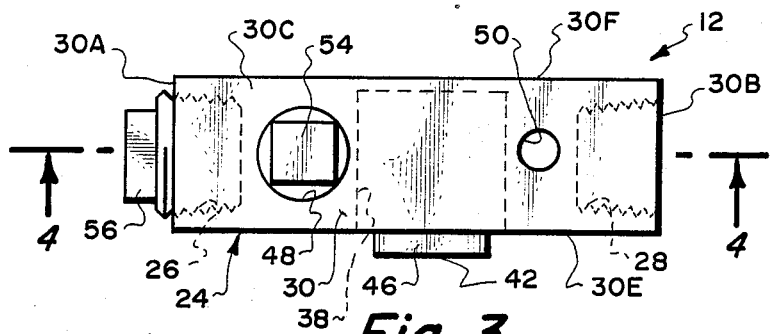
FIG. 3 is a top plan view, on a slightly smaller scale, of the device of FIG. 2.
Figure 4:
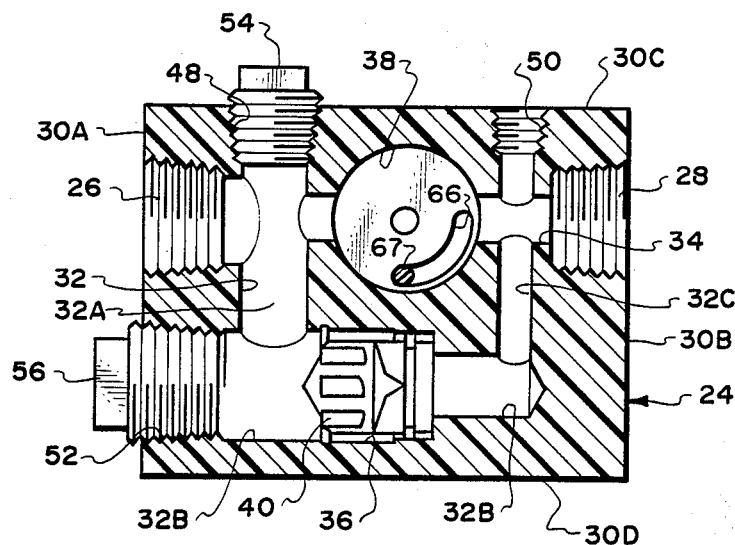
FIG. 4 is a vertical sectional view of the device taken along line 4—4 of FIG. 3.

Referring now to FIGS. 2-4, there is illustrated one of the fluid flow rate control devices 12 used in the irrigation system 10, being constructed in accordance with the principles of the present invention. In its basic components, the fluid flow rate control device 12 includes a body 24, inlet and outlet ports 26, 28 recessed in an external surface 30 of the body 24, first and second passages 32, 34 formed internally in the body 24, first and second chambers 36, 38 in the respective first and second passages 32, 34, a flow regulating mechanism 40 disposed in the first chamber 36, and a flow diverting mechanism 42 disposed in the second chamber 38.

More particularly, the recessed inlet port 26 is internally threaded for connection to the water line 14 to receive water therefrom. The recessed outlet port 28 is also internally threaded for connection to a respective one of the feed lines 18 for discharging water thereto. The first and second passages 32, 34 in the body 24 extend between the inlet and outlet ports 26, 28 to respectively provide first and second internal water flow paths through the body 24 from the inlet port 26 to the outlet port 28. The first and second chambers 36, 38 in the respective first and second passages 32, 34 are spaced from the inlet and outlet ports 26, 28. The first chamber 36 is closed at the external surface 30 to the body 24, whereas the second chamber 38 has an opening 44 defined at the external surface 30 of the body 24.

Thus, the flow regulating mechanism 42 disposed in the first chamber 38 is hidden from view at the external surface 30 of the body 24. The flow regulating mechanism 42 controls or regulates fluid flow through the first flow path of the first passage 32 to provide a preset constant rate of fluid flow from the body 24 at the outlet port 28 into the respective feed line 18 and thereby define a controlled mode of operation of the device 12. In the controlled mode of operation, each fluid flow rate control device 12 ensures a constant downstream flow of water regardless of pressure variations upstream so as to thereby deliver the precise amount of water to the plant root zones by the feed lines.

On the other hand, the flow diverting mechanism 42 disposed in the second chamber 38 has an actuating element 46 exposed through the opening 44 of the second chamber 38 and projecting beyond the external surface 30 of the body 24. The actuating element 46 can be gripped for manually turning the flow diverting mechanism 42 to adjust it between a first angularly displaced condition, seen in FIG. 5, for blocking fluid flow through the second flow path and a second angularly displaced condition, seen in FIG. 6, for permitting fluid flow through the second flow path.

Therefore, adjustment of the flow diverting mechanism 42 to its first condition correspondingly causes the device 12 to operate in the controlled mode to discharge fluid from the outlet port 28 at the constant flow rate since the second passage 34 of unregulated water flow is closed. Conversely, adjustment of the flow diverting mechanism 42 to its second condition correspondingly causes the device 12 to operate in a by-pass mode to discharge fluid from the outlet port 28 at an augmented flow rate which combines the unregulated greater rate of fluid flow through the second flow path from the main water line 14 with the regulated lesser rate of fluid flow through the first flow path from the flow regulating mechanism 40. The combined rate of water flow now delivered to the respective feed line 18 is thereby higher than the constant flow rate alone. The flow path through the flow diverting mechanism 42 has considerably less restriction than through the flow regulating mechanism 40 which causes the total flow rate across the device 12 to be considerably greater in the by-pass mode than in the controlled mode of operation of the device 12.

The actuation of the flow diverting mechanism 42 from its first closed condition (FIG. 5) to its second opened condition (FIG. 6) is used for two purposes: first, for expanding the porous pipe for unclogging its pores; and, second, for injecting chemicals and fertilizers into the device 12 for delivery to the feed line 18. The higher combined rate of water flow in the by-pass mode of operation of the device 12 causes increased expansion of the pores in walls of porous feed line pipe which permits dislodging of deposits and debris therefrom and flushing thereof out the flush ports 20. When the flow diverting mechanism 42 is returned to its first closed condition, returning the device to its controlled mode of operation and decreasing the flow rate to the constant flow rate, the pores contract back to their original size.

For injecting fluids, such as chemicals and fertilizers, and to carry out other functions, the fluid flow rate control device 12 also has an auxiliary port 48, a pressure port 50, and an access port 52. The auxiliary port 48 for connecting a fluid injector to the device 10 is internally threaded and recessed in the external surface 30 of the body 24 and connnected to the first and second chambers 36, 38 therein. The auxiliary port 48 is closed by a threaded plug 54 except during the short intervals when the fluid injector is connected to it. The pressure port 50 is also internally threaded and recessed in the external surface 30 of the body 24 but connected to the first and second passages 32, 34 downstream of the respective first and second chambers 36, 38 therein. A pressure gauge (not shown) is typically permanently installed in the pressure port 50 at its location downstream of the flow regulating mechanism 40 for monitoring water pressure in the respective feed line 18. In such manner, clogging of the feed line 18 can be detected. The access port 52 is internally threaded and recessed in the external surface 30 of the body 24 and connected to the first passage 32 upstream of and in axial alignment with the first chamber 36. The access port 52 permits installation and replacement of the flow regulating mechanism 40 without detaching the device 12 from the main supply and feed lines 14, 18. Except at such times when the flow regulating mechanism 40 is being installed or replaced, a threaded plug 56 closes the access port 52.

In the exemplary embodiment seen in FIGS. 2-4, the body 24 of the device 12 is a one-piece molded plastic rectangular-shaped block with the external surface 30 being composed of a pair of opposite end surface portions 30A, 30B, a pair of opposite top and bottom surface portions 30C, 30D, and a pair of opposite side surface portions 30E, 30F. The inlet port 26 and access port 52 are recessed in one end surface portion 30A, whereas the outlet port 28 is recessed in the other end surface portion 30B. It will be noted also that the inlet and outlet ports 26, 28 are axially aligned with one another and with the second passage 34.

Further, the first passage 32 is preferably formed by first, second and third interconnected internal cylindrical bores 32A, 32B, 32C arranged in the body 24 in a generally U-shaped configuration. The second passage 34 is preferably formed by a fourth cylindrical bore which intersects the first and third bores 32A, 32C of the first passage 32 and extends generally parallel to the second bore 32B thereof. It will be noted that the first and second bores 32A, 32B are larger in diameter than the third and fourth bores 32C, 34. The second chamber 38 which receives the flow diverting mechanism 42 is formed by a cylindrical surface having an axis which extends in orthogonal relation to an axis of the fourth bore 34. The inlet port 26 connects with the first and fourth bores 32A, 34, the auxiliary port 48 connects with the first and fourth bore 32A, 34, the pressure port 50 connects with third and fourth bores 32C, 34, and the access port 52 connects with the second bore 32B.

Figure 5:
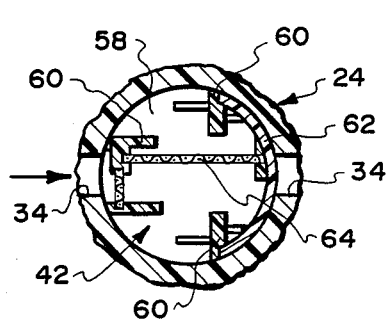
FIG. 5 is a sectional view of a flow diverting mechanism of the device of FIG. 2 in a closed position.
Figure 6:
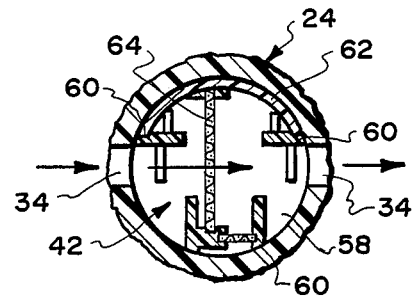
FIG. 6 is a sectional view of the flow diverting mechanism in an opened position.

The flow diverting mechanism 42 can be any two-way manually operated valve design, such as a ball valve, plug valve or a gate valve. The one shown in FIGS. 2, 5 and 6, is illustrated and described in U.S. Pat. No. 4,722,794 to Duncan. Basically, the mechanism 42 has opposite circular plates 58 spaced apart by rigidly connected support posts 60 and is rotatably mounted within the second chamber 38. The peripheral edges of the plates 58 mount O-rings (not shown) which provide seals with the opposite ends of the cylindrical surface of the second chamber 38. An arcuate seal plate 62 is loosely mounted between the end plates 58 and provides the structure which blocks the second passage 34 when the mechanism 42 is in its first angularly displaced closed condition seen in FIG. 5. The pressure of the water against the arcuate seal plate 62 is what maintains it in the desired position sealably forced against the cylindrical surface of the second chamber and blocking the second passage. When the mechanism 42 is moved to its second angularly displaced opened condition seen in FIG. 6, the arcuate plate 62 is carried away from its previous blocking position. Further, a filter screen 64 extends between and is carried by the end plates 58. The screen 64 extends across the path of water flow through the mechanism 42 when in its opened condition of FIG. 6. An arcuate recess 66 provided in the body 24 at the closed side of the second chamber 38 receives a protuberance 67 on the adjacent one of the plates 58 of the mechanism 42 and in such manner defines the limits of rotation thereof.

The by-pass valve of the invention provides the following advantages:

1. It puts a constant downstream flow of water into the system regardless of pressure variations upstream. With a pressure gauge installed in the top of the unit, the zone pressure can be monitored anytime. This is essential because:
   a. It allows plantings to get required water regardless of pipe begins to clog. If a pressure regulator was installed instead of a flow regulator, the amount of water available to plantings would decrease as the pipe clogged. The flow regulator, however, will emit the same amount of water, just at a higher pressure.
   b. The pressure gauge allows one to observe these changes and make a maintenance schedule to correspond with water quality.
   c. Being one unit allows ease of installation and cost savings.
2. The built in by-pass allows an easy way to purge or fertilize the system. It can be done by two methods:
   a. Expanding pipe: Open the by-pass and allow more water and pressure into the system. This will expand the walls of the pipe and dislodge some particles that have built-up.
   After this has operated for a given period of time, it is essential to open the flush caps and let the debris out of system. The pressure gauge should show a substantial decrease when returned to normal operation.
   b. Chemically: By opening the by-pass, head pressure decreases allowing a venturi injector to work with the system. This will let purging chemicals or fertilizers to be easily injected into the system.
3. The threaded port on top of the unit can be used to install a special flow through injector. Having this option on the unit gives more flexibility to the irrigation contractor.
4. The threaded port on the side of the unit will allow one to exchange the flow regulator if desired.

This unit is compact and fits in a standard valve box. It should be useful on all installations and improve the performance of the system. The unit using porous pipe is easy to install and use.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A pressure compensating flow rate control device, comprising:
   (a) a body having an external surface with an inlet port recessed therein for receiving a fluid and an outlet port recessed therein for discharging a fluid;
   (b) means defining a first passage internally of said body and extending between and interconnecting said inlet and outlet ports for providing a first internal fluid flow path through said body from said inlet port to said outlet port;
   (c) means defining a first chamber internally of said body in said first passage thereof and being spaced from said inlet and outlet ports and closed at said external surface of said body;
   (d) a flow regulating mechanism disposed in said first chamber and hidden from view at said external surface of said body for regulating fluid flow through said first flow path to provide a preset constant rate of fluid flow from said body at said outlet port and thereby define a controlled mode of operation of said device;
   (e) means defining a second passage internally of said body extending between and interconnecting said inlet and outlet ports for providing a second internal flow path through said body from said inlet port to said outlet port;
   (f) means defining a second chamber internally of said body in said second passage thereof spaced from said inlet and outlet ports and having an opening defined in the external surface of said body and spaced from said first and second external surface portions; and
   (g) a flow diverting mechanism disposed in said second chamber and having an actuating element exposed through said opening of said second chamber for adjusting said flow diverting mechanism between a first condition for blocking fluid flow through said second flow path and a second condition for permitting fluid flow through said second flow path and thereby for correspondingly operating said device in said controlled mode to discharge fluid from said outlet port at said constant flow rate and in a by-pass mode to discharge fluid from said outlet port at an augmented flow rate which combines fluid flow through said second flow path with fluid flow through said first flow path and is thereby higher than said constant flow rate alone.

2. The device of claim 1 wherein said external surface of said body has opposite end surface portions with said inlet port recessed in one end surface portion and said outlet port recessed in the other end surface portion.

3. The device of claim 2 wherein said inlet and outlet ports are axially aligned with one another.

4. The device of claim 2 wherein said external surface of said body has opposite side surface portions extending between said opposite end surface portions and said opening of said second chamber is in one of said side surface portions.

5. The device of claim 1 further comprising an auxiliary port recessed in said external surface of said body for receiving a fluid, said auxiliary port being connected to said first and second passages upstream of said respective first and second chambers therein.

6. The device of claim 1 further comprising a pressure port recessed in said external surface of said body for connection with a pressure gauge, said pressure port being connected to said first and second passages downstream of said respective first and second chambers therein.

7. The device of claim 1 further comprising an access port recessed in an external surface portion of said body and being connected to said first passage upstream of and in axial alignment with said first chamber therein for permitting installation and replacement of said flow regulating mechanism in said first chamber.

8. The device of claim 1 wherein said first passage is formed by first, second and third interconnected cylindrical bores defined in said body in a generally U-shaped configuration.

9. The device of claim 8 wherein said second passage is formed by a fourth cylindrical bore defined in said body, said fourth bore intersecting said first and third bores of said first passage and extending generally parallel to said second bore thereof.

10. The device of claim 9 wherein said second chamber is formed by a cylindrical surface having an axis which extends in orthogonal relation to an axis of said fourth bore.

11. A pressure compensating flow rate control device, comprising:
   (a) a one-piece molded plastic body having an external surface composed of a pair of opposite end surface portions, a pair of opposite top and bottom surface portions, and a pair of opposite side surface portions, and including an inlet port recessed in one end surface portion for receiving a fluid and an outlet port recessed in the other end surface portion for discharging a fluid;
   (b) means defining a first passage internally of said body and extending between and interconnecting said inlet and outlet ports for providing a first internal fluid flow path through said body from said inlet port to said outlet port;
   (c) means defining a first chamber internally of said body in said first passage thereof and being spaced from said inlet and outlet ports and closed at said external surface of said body;
   (d) a flow regulating mechanism disposed in said first chamber and hidden from view at said external surface of said body for regulating fluid flow through said first flow path to provide a preset constant rate of fluid flow from said body at said outlet port and thereby define a controlled mode of operation of said device;
   (e) means defining a second passage internally of said body extending between and interconnecting said inlet and outlet ports for providing a second internal flow path through said body from said inlet port to said outlet port;
   (f) means defining a second chamber internally of said body in said second passage thereof spaced from said inlet and outlet ports and having an opening defined in one of said side surface portions of said external surface of said body and spaced from said first and second external surface portions; and
   (g) a flow diverting mechanism disposed in said second chamber and having an actuating element exposed through said opening of said second chamber for adjusting said flow diverting mechanism between a first condition for blocking fluid flow through said second flow path and a second condition for permitting fluid flow through said second flow path and thereby for correspondingly operating said device in said controlled mode to discharge fluid from said outlet port at said constant flow rate and in a by-pass mode to discharge fluid from said outlet port at an augmented flow rate which combines fluid flow through said second flow path with fluid flow through said first flow path and is thereby higher than said constant flow rate alone.

12. The device of claim 11 wherein said inlet and outlet ports are axially aligned with one another.

13. The device of claim 11 wherein said first passage is formed by first, second and third interconnected cylindrical bores defined in said body in a generally U-shaped configuration.

14. The device of claim 13 wherein said second passage is formed by a fourth cylindrical bore defined in said body, said fourth bore intersecting said first and third bores of said first passage and extending generally parallel to said second bore thereof.

15. The device of claim 14 wherein said second chamber is formed by a cylindrical surface having an axis which extends in orthogonal relation to an axis of said fourth bore.

16. The device of claim 15 further comprising an auxiliary port recessed in one of said top and bottom surface portions of said external surface of said body for receiving a fluid, said auxiliary port being connected to said first bore of said first passage and fourth bore of said second passage upstream of said first and second chambers in said respective first and second passages.

17. The device of claim 15 further comprising a pressure port recessed in one of said top and bottom surface portions of said external surface of said body for connection with a pressure gauge, said pressure port being connected to said third bore of said first passage and said fourth bore of said second passage downstream of said first and second chambers in said respective first and second passages.

18. The device of claim 15 further comprising an access port recessed in said one end surface portion of said external surface of said body and being connected to said second bore of said first passage upstream of and in axial alignment with said first chamber therein for permitting installation and replacement of said flow regulating mechanism in said first chamber.

19. In a subsurface micro irrigation system which includes a water line for supplying water under pressure and at least one feed line composed of porous pipe having pores in the walls of the pipe for delivering water under pressure through the pipe wall pores to plant root zones, a pressure compensating rate control device, comprising:
(a) a one-piece molded plastic body having an external surface composed of a pair of opposite end surface portions, a pair of opposite top and bottom surface portions, and a pair of opposite side surface portions, and including an inlet port recessed in one end surface portion and connected to said main water line for receiving supply water therefrom and an outlet port recessed in the other end surface portion and connected to said feed line for discharging water thereto;
(b) means defining a first passage internally of said body and extending between and interconnecting said inlet and outlet ports for providing a first internal fluid flow path through said body from said inlet port to said outlet port;
(c) means defining a first chamber internally of said body in said first passage thereof and being spaced from said inlet and outlet ports and closed at said external surface of said body;
(d) a flow regulating mechanism disposed in said first chamber and hidden from view at said external surface of said body for regulating water flow through said first flow path to provide a preset constant rate of water flow from said body at said outlet port to said feed line and thereby define a controlled mode of operation of said device;
(e) means defining a second passage internally of said body extending between and interconnecting said inlet and outlet ports for providing a second internal flow path through said body from said inlet port to said outlet port;
(f) means defining a second chamber internally of said body in said second passage thereof spaced from said inlet and outlet ports and having an opening defined in one of said side surface portions of said external surface of said body and spaced from said first and second external surface portions; and
(g) a flow diverting mechanism disposed in said second chamber and having an actuating element exposed through said opening of said second chamber for adjusting said flow diverting mechanism between a first condition for blocking water flow through said second flow path and a second condition for permitting water flow through said second flow path and thereby for correspondingly operating said device in said controlled mode to discharge water from said outlet port to said feed line at said constant flow rate and in a by-pass mode to discharge water from said outlet port to said feed line at an augmented flow rate which combines water flow through said second flow path with water flow through said first flow path and is thereby higher than said constant flow rate alone.

20. The device of claim 19 wherein said inlet and outlet ports are axially aligned with one another.

21. The device of claim 19 wherein said first passage is formed by first, second and third interconnected cylindrical bores defined in said body in a generally U-shaped configuration.

22. The device of claim 21 wherein said second passage is formed by a fourth cylindrical bore defined in said body, said fourth bore intersecting said first and third bores of said first passage and extending generally parallel to said second bore thereof.

23. The device of claim 22 wherein said second chamber is formed by a cylindrical surface having an axis which extends in orthogonal relation to an axis of said fourth bore.

24. The device of claim 23 further comprising an auxiliary port recessed in one of said top and bottom surface portions of said external surface of said body for receiving a fluid, said auxiliary port being connnected to said first bore of said first passage and fourth bore of said second passage upstream of said first and second chambers in said respective first and second passages.

25. The device of claim 23, further comprising a pressure port recessed in one of said top and bottom surface portions of said external surface of said body for connection with a pressure gauge, said pressure port being connected to said third bore of said first passage and said fourth bore of said second passage downstream of said first and second chambers in said respective first and second passages.

26. The device of claim 23, further comprising an access port recessed in said one end surface portion of said external surface of said body and being connected to said second bore of said first passage upstream of and in axial alignment with said first chamber therein for permitting installation and replacement of said flow regulating mechanism in said first chamber.

27. The device of claim 19 in which the porous pipe is found of elastomer particles dispersed in a thermoplastic resin.

28. The device according to claim 27 in which the particles are ground rubber and the resin is polyethylene.

* * * * *